Nov. 25, 1930.  V. R. KOONTZ  1,782,472
DIE HEAD
Filed Aug. 25, 1927  3 Sheets-Sheet 1
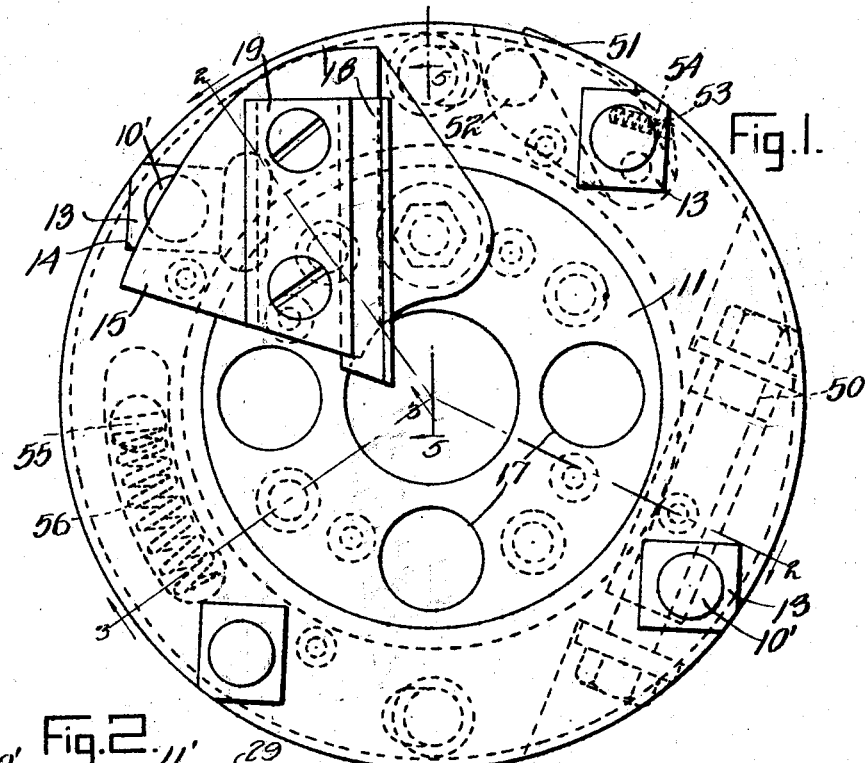
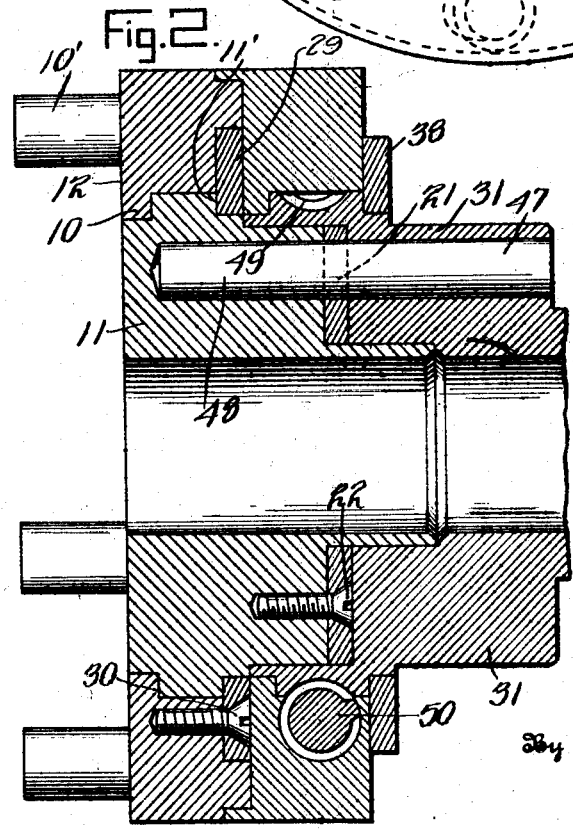
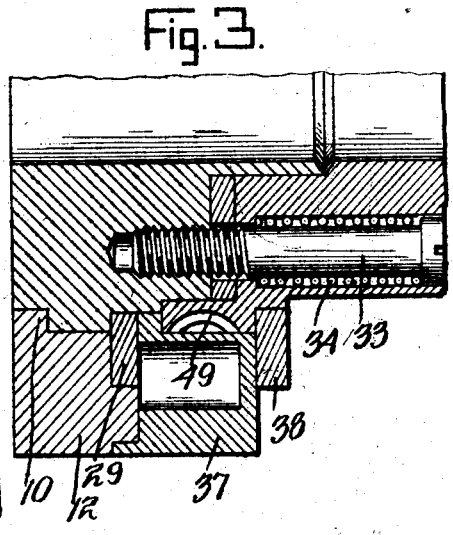
Inventor
Victor R. Koontz
By
Attorney

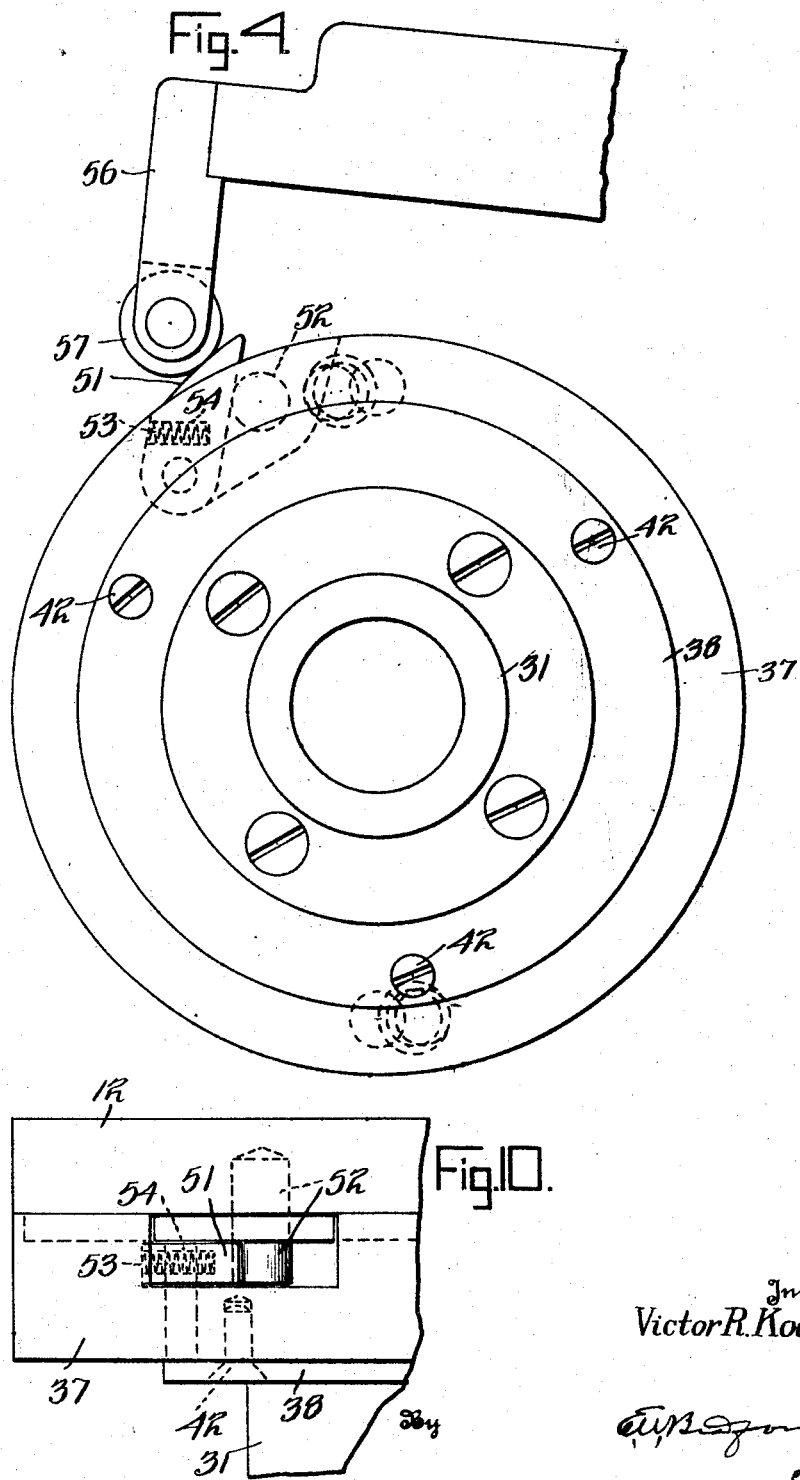

Nov. 25, 1930. V. R. KOONTZ 1,782,472
DIE HEAD
Filed Aug. 25, 1927 3 Sheets-Sheet 3
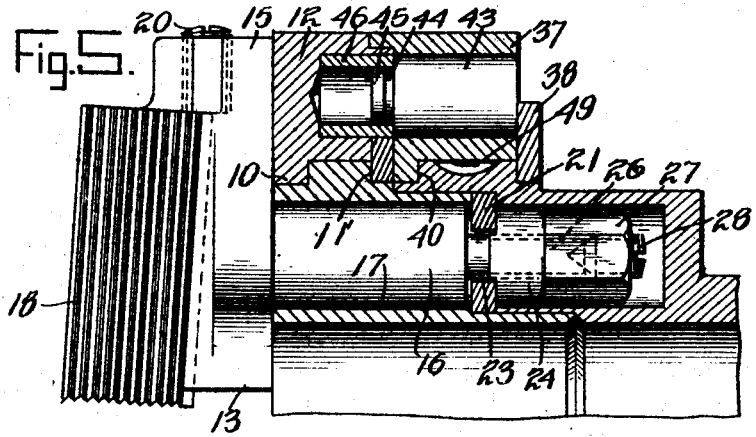
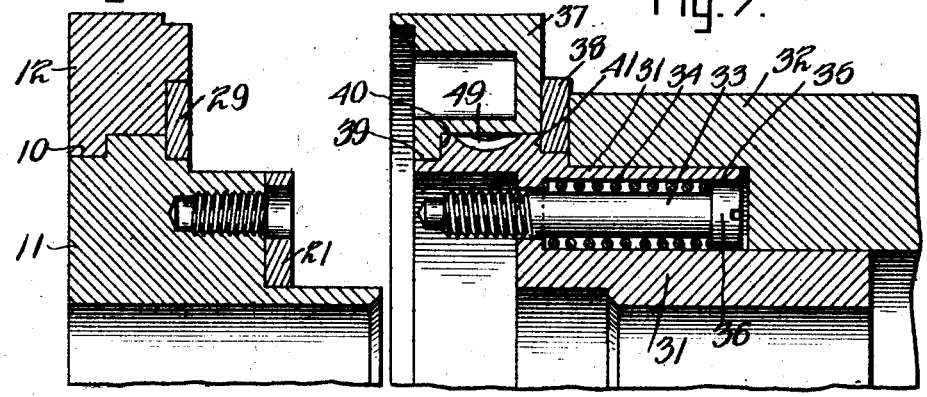
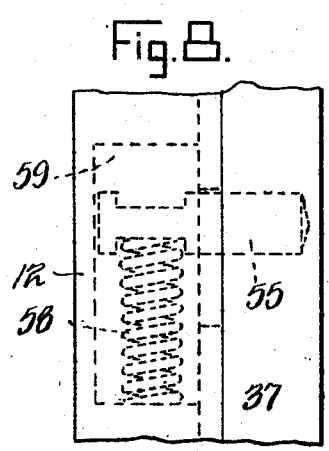
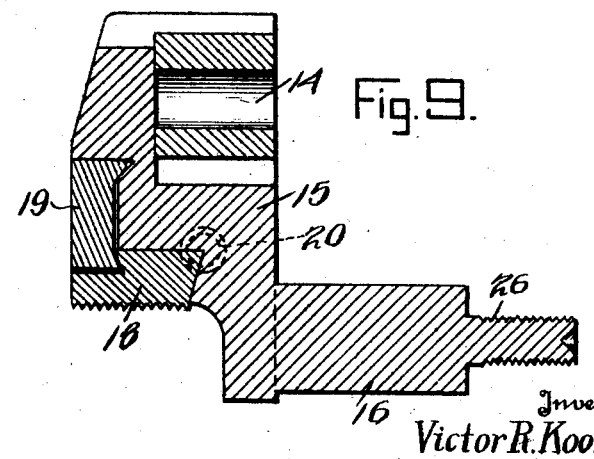
Inventor
Victor R. Koontz Patented Nov. 25, 1930

1,782,472

UNITED STATES PATENT OFFICE

VICTOR R. KOONTZ, OF WAYNESBORO, PENNSYLVANIA, ASSIGNOR TO LANDIS MACHINE COMPANY, OF WAYNESBORO, PENNSYLVANIA, A CORPORATION

DIE HEAD

Application filed August 25, 1927. Serial No. 215,429.

My invention relates to die heads and particularly to die heads used with machines for cutting threads on bolts, pipes, etc., and is designed especially for use with the type of machines known as automatic screw machines in which the threading operation is combined with other operations such as turning or forming, pointing, cutting off, etc. As herewith shown, it is embodied in a revolving thread cutting device of the type known as the "Landis" head using the end sharpened tangential cutters or chasers, said devices usually used on rotating work.

On machines of the type known as automatic screw machines the preferred practice is that the die head is presented to the work by means of a movable member carrying the head which moves in a line with the axis of the work. The die head is forced on the work by said moving member and travels in a line with the axis of the work in accordance with the pitch of the thread which is being cut and at some predetermined point the die head holding member is stopped in its forward travel acting essentially the same as the retarding movement, which stoppage or retarding causes the die head to open.

The primary object of this invention is to provide a rotary die head of this character adapted to open from its closed or cutting position upon retarding the axial movement of the die head or the work, the movement of the die head or the work being in line with the axis of the work upon which the threading is being done.

Another object of my invention is to provide a die head whose axial length is much less than those heretofore known.

Another object of my invention is to provide a die head of a type which opens from its closed or cutting position due to the stoppage of the longitudinal travel of the die head carrying member in which the resultants of the threading thrusts are taken up more positively than in inventions heretofore known. In inventions heretofore known in which a separation occurs through the retarding of the die head carrying member the resultant forces due to the cutting thrust are all concentrated or thrown to one point, whereas, it will be observed, that in the invention herein disclosed, the resultant forces are divided so as to provide more rigidity in the die head and maintain the size of the members being threaded without variation, all of which constitute distinct advantages.

Another object of my invention is to provide mechanism operated by the rotary action of the die head for closing the head from a non-cutting to a cutting position. In inventions, heretofore disclosed, using tangential chasers, the die head has been closed by hand or by the lateral movement of the member which actuates the member controlling the open and closed positions of the head.

Further objects and advantages of the invention will become apparent as the description proceeds.

Referring to the accompanying drawings which are made a part hereof and on which similar reference characters indicate similar parts, Figure 1 is a face elevation of the device of my invention with three of the cutter carrying holders removed, Figure 2 is a side elevation thereof partly in section with the cutter carrying holders and actuating blocks removed.

Figure 3 is a sectional view on line 3—3 of Fig. 1.

Figure 4 is a rear view of my device.

Figure 5 is a section on the line 5—5 of Fig. 1.

Figures 6 and 7 correspond to Fig. 3 with the head divided into two units.

Figure 8 is a detail side view of Fig. 1 showing the springs in position to rotate the opening ring.

Figure 9 is a sectional view of the cutter and cutter carrying holder, and

Figure 10 is a detail view showing the closing means.

In the drawings reference character 11 indicates a front body member of the die head which carries an opening ring 12. This ring has an inner flange 10 and a stud 10' for engaging a block 13 slidable in a groove 14 in a chaser holder 15. The chaser holders 15 carry tangential chasers 18 secured thereon by clamps 19, the said chasers being abutted by abutting screws 20 in a well known manner. The chaser holders have trunnions 16 either made integral therewith, as shown in Fig. 9, or attached thereto by bolts or screws. The trunnions 16 operate in bores 17 in the front body member. A plate 21, fastened to the rear of the front body member by means of screws 22, has holes 23 therein for receiving reduced screw threaded portions 26 of the trunnion. Nuts 24, screwed down on the reduced portions 26 of the trunnions, engage the plate 21 with only sufficient tightness to allow the trunnions to rock but have no appreciable axial play. An additional nut 27 is secured upon the top of the first nut and a plug 28 is screw threaded into the last named nut and has a conical point which is seated in a conical depression in the end of the trunnion whereby the nuts are locked against radial displacement. The trunnions, therefore, may be locked in position so as to permit the necessary oscillating movement with a minimum of axial movement. A retaining ring 29 is secured to the opening ring 12 by means of screws 30 and rests against a shoulder 11' on the body member 11. By means of the flange 10 and the retaining ring 29 the ring 12 is secured against axial displacement.

Numeral 31 indicates a second body or driving member carried by the holding member 32 of the machine. This member 31 is secured to the body member 11 by means of screws or bolts 33 in such a manner as to permit a slight axial movement between the members 11 and 31 but to prevent relative rotary motion between the two. The bolts 33 are screw threaded into the member 11 and have springs 34 surrounding them positioned between the bottom of a bore 35 in the member 31 and the head 36 of the said bolts. The spring 34, compressed between the bottom of the bore and the head of the bolt, urges the members 11 and 31 tightly together. Mounted upon body member 31 is an adjusting and locking ring 37 held in place by a retaining ring 38. The ring 37 has an inner flange 39 for engaging a shoulder 40 on the rear body member 31. The retaining ring 38 rests against a rear shoulder 41 on the rear body member. The ring 38 is fastened to the ring 37 by screws or bolts 42. Mounted in the member 37 are locking pins 43 whose ends 44 engage recesses 45 in the opening ring 12. These recesses may have hardened bushings 46 therein. Mounted in the body or driving member 31 are pins 47 extending into the body member 11 as at 48. If desired, the pins 47 may be fixed in the front body member 11 and extend into bores in the rear body member 31. Body member 11 is therefore secured against rotation relatively to member 31 through the medium of these pins 47 and the ring 12 is secured against relative rotation to the driving member 31 through pins 43 mounted in ring 37.

The ring 37 which carries the locking pins 43 may be adjusted around the rear body member 31 by means of a worm 50. This worm engages worm threads 49 on the rear body member and, as will be readily seen, rotating the worm will adjust the ring around the rear body member and move the front ring 12 to adjust the position of the chaser holders 15. This adjusting means is well known in the art.

It will thus be seen that the resultant of the cutting forces are divided being taken by worm threads 49 and pins 47. It will also be seen that the front body member is secured against rotation relative to member 31 but is at the same time free to move axially relative to the member 31, the bolts 47 and springs 34 limiting and governing the axial movement.

Pivotally mounted in the ring 37 is a closing finger 51. This finger is positioned to rest against a pin 52 mounted in the opening ring 12. A spring 53, seated in a bore 54 in the back of the finger 51 and pressing against the edge of the recess in which the finger is placed, tends to keep the finger in engagement with the pin 52. Mounted in a recess 59 in the closing ring 12 is a spring 58 one end of which abuts against the end of the recess in said ring and the other end against a pin 55 mounted in the ring 37, the end of the pin 55 extending into the recess in the ring 12.

A member 56 mounted upon the cutting machine, not shown, has a roller 57 mounted therein which roller coming in engagement with the finger 51 as the head rotates rocks the finger on its pivot so as to rotate the ring 12 relative to the ring 37 and close the die head to the cutting position against the tension of spring 58. When the rings have been rotated to the position where the pins 44 register with the sockets 45, the body members 11 and 31 are forced together by the springs 34 surrounding the holding bolts 33.

The operation of the die head will now be explained.

During a cutting operation the member 32, carrying the die head, travels axially into the work at a speed corresponding to the pitch of the thread being formed. When the thread has been cut to the predetermined length the member 32, carrying the member 31, will be retarded in its movement by engagement with any suitable stop mechanism on the frame of the machine in a well known manner. The die head may be fed upon the work by the threads on the work or by a special lead screw, such for example as that shown in the patent to Fisher #1,251,209. As the head continues to rotate the screw threads on the work will cause the member 11, carrying the ring 12, to be continued in its axial movement so as to separate the members 11 and 31 against the tension of the spring 34. This movement will continue until such a time as the pin ends 44 become disengaged from the bushings 46 whereupon the spring 58 under tension will rotate the ring 12 with respect to the head body member 11 and thus move the cutters to open position. The head is then withdrawn from the work to the starting positions, the die head continuing to rotate. The finger 51 coming in engagement with the roller 57, forces the ring 12 in the reverse direction to move the chasers to cutting position.

As mentioned above, as soon as the ring 12 is rotated to the position where the holding pins 44 register with the bushings 46, the members 11 and 31 are drawn together and locked.

It will be obvious to those skilled in the art that various changes may be made in my device without departing from the spirit of the invention, and I, therefore, do not limit myself to what is shown in the drawings and described in the specification, but only as set forth in the appended claims.

Having thus fully described my said invention, what I claim as new and desire to secure by Letters Patent, is:

1. In a die head, the combination of a front unit comprising a front body member, chaser holders pivotally supported thereon, tangential chasers on the holders, a closing ring connected to the chaser holders, means for holding the closing ring in position on said front body member comprising a coacting flange on the closing ring and another ring fastened to the closing ring, a separate rear body member carrying an adjusting and locking ring, means for holding the adjusting and locking ring in place on said rear body member comprising a coacting flange on the adjusting and locking ring, another ring fastened to the adjusting and locking ring, and means for securing the front and rear body members together, substantially as set forth.

2. In a die head, the combination of a front unit comprising a head body member, chaser holders pivotally supported thereon, tangential chasers on the holders, a closing ring connected to the holders, said closing ring being mounted on said head body, a rear unit comprising a second body member, an adjusting and locking member mounted on said second body member, locking and driving pins mounted in the adjusting and locking member and adapted to engage in apertures in the closing ring which is mounted on the said head body and connected to said chaser holders, said head body with holders and closing ring being movable axially in relation to the second head body member, substantially as set forth.

3. A die head consisting of two assembled units, the front unit comprising a head body member, chaser holders pivotally mounted thereon, a closing ring mounted on said head body member, a rear unit comprising a second head body member, an adjusting and locking ring mounted on said second head body member, and means for moving the closing ring of the front unit to locking position comprising a lever pivotally mounted in said adjusting and locking ring and operating against a projection or pin in said closing ring of the front unit to operate the closing ring to locking position, substantially as set forth.

4. A die head consisting of front and rear units, the front unit comprising a front body member having chaser holders pivotally mounted therein, a closing ring mounted on the front body member and connected with the chaser holders, means for holding the said ring against axial displacement on the said head body member, means tending to rotate the ring to move the chaser holders to open position, and a rear unit comprising a rear body member and an adjusting ring mounted thereon and secured against axial movement on the body member, means for locking the body members together to hold them against relative rotary movement but to permit axial movement, comprising pins mounted on the rear body member adapted to engage bores in the front body member, substantially as set forth.

5. A two unit die head comprising means for mounting chasers and chaser holders thereon, means for moving the chaser holders from cutting to non-cutting position, means for locking them in cutting position, said last-named means being mounted on a rear unit, and means for adjusting the position of the holders to cut threads of different diameters, the said last named means cooperating with axial pins on the rear unit engaging bores in the front body member for directly receiving the cutting thrust of the die head while in operation, substantially as set forth.

6. A die head consisting of front and rear units, the front unit comprising a front body member having chaser holders pivotally mounted therein, a rotary ring mounted upon said front body member and connected to said chaser holders, an inner flange on said ring cooperating with a shoulder on the said front body member to prevent axial movement in one direction, a ring mounted upon the rear of said rotary ring and adapted to rest against a shoulder on said body member to hold the said ring against axial displacement on the head body, means for urging the said ring to move the chaser holders to the open or non-cutting position, the rear unit comprising an adjusting ring having pins therein adapted, to engage sockets in the ring on the front body member and to hold the ring against relative rotation, pins in the said rear body member adapted to engage sockets in the front body member and to act as driving means therefor, resilient means for holding the two body members against axial displacement, and means operable at a predetermined stage in the axial movement of the die head for operating means for closing the die head, substantially as set forth.

7. A die head comprising a front and a rear unit, the front unit comprising a body member, an opening ring mounted on the body member, chaser holders pivoted to the body member and to the opening ring, the rear unit comprising a body member, an adjusting ring secured on the body member, means on the adjusting ring for locking the opening ring in cutting position, means between the opening ring and the adjusting ring for moving the opening ring to move the chasers to open position when the opening ring is released by the holding means on the adjusting ring and pins on the rear body member engaging bores in the front body member for driving the front unit by the rear unit, substantially as set forth.

8. A two unit die head comprising a front and a rear unit, the front unit including a body member, an opening ring mounted thereon and chaser holders carrying chasers mounted on the body member and the opening ring, the rear unit including a rear body member, an adjusting ring mounted thereon and means for locking the opening ring in thread cutting position and means mounted in the rear body member for directly engaging the front body member for driving the front body member and receiving the cutting thrust of the chasers, substantially as set forth.

9. A two unit die head comprising means for mounting tangential chasers and chaser holders thereon, means for moving the chaser holders from cutting to non-cutting position, means for locking them in cutting position and means for adjusting the die head to cut threads of different diameters, the said last two means being mounted on a rear unit, said means for adjusting the die head to size cooperating with axial pins on the rear unit engaging bores in the front body member for reciving the cutting thrust of the die head while in operation, substantially as set forth.

In witness whereof, I have hereunto set my hand at Waynesboro, Pennsylvania, this 3rd day of August, A. D. nineteen hundred and twenty-seven.

VICTOR R. KOONTZ.